US010890968B2

(12) United States Patent
Kurlethimar et al.

(10) Patent No.: US 10,890,968 B2
(45) Date of Patent: Jan. 12, 2021

(54) ELECTRONIC DEVICE WITH FOVEATED DISPLAY AND GAZE PREDICTION

(71) Applicant: Apple Inc., Cupertino, CA (US)

(72) Inventors: Yashas Rai Kurlethimar, Sunnyvale, CA (US); Andrew B. Watson, Los Gatos, CA (US); Nicolas P. Bonnier, Campbell, CA (US); Mehmet N. Agaoglu, Cupertino, CA (US); Alexander G. Berardino, Cupertino, CA (US); Elijah H. Kleeman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/376,329

(22) Filed: Apr. 5, 2019

(65) Prior Publication Data

US 2019/0339770 A1 Nov. 7, 2019

Related U.S. Application Data

(60) Provisional application No. 62/668,124, filed on May 7, 2018.

(51) Int. Cl.
*G06F 3/01* (2006.01)
*G02B 27/01* (2006.01)

(52) U.S. Cl.
CPC ......... *G06F 3/013* (2013.01); *G02B 27/0101* (2013.01); *G06F 3/012* (2013.01)

(58) Field of Classification Search
CPC ......... A61B 3/113; G06F 17/30; G06F 19/00; G06F 17/30598; G06F 17/3053;
(Continued)

(56) References Cited

U.S. PATENT DOCUMENTS 7,850,306 B2  12/2010  Uusitalo et al.
9,665,171 B1   5/2017  Skogo et al.
(Continued)

FOREIGN PATENT DOCUMENTS

CN  104777615 A  7/2015

OTHER PUBLICATIONS

Arabadzhiyska, Elena, et al. Saccade Landing Position Prediction for Gaze-Contingent Rendering ACM Transactions on Graphics (TOG) 36.4 (2017): 50.
(Continued)

*Primary Examiner* — Heather R Jones
(74) *Attorney, Agent, or Firm* — Treyz Law Group, P.C.; Jason Tsai; Joseph F. Guihan

(57) ABSTRACT

An electronic device may have a foveated display, an eye-tracking system and a head movement detection system. The eye-tracking system may gather information on a user's point of regard on the display while the head movement detection system may capture information regarding the rotation of the observer's head. Based on the point-of-regard information, head rotation information, image data, the type of eye/head movement that is underway, and/or tiredness information, control circuitry in the electronic device may produce image data for a display, with areas of different resolutions and(or) visual quality. A full-resolution and(or) quality portion of the image may overlap the point of regard. One or more lower resolution portions of the image may surround the full-resolution portion. The control circuitry may include a gaze prediction system for predicting the movement of the user's gaze during a saccade.

15 Claims, 13 Drawing Sheets

(58) Field of Classification Search
CPC ........ G06F 19/363; G06F 3/013; G06F 3/012;
G06T 5/00; G06T 3/403; G06T 15/20;
G06T 2207/20024; G06T 2207/20221;
G06T 2210/36; G06T 2207/20192; G06T
7/20; G06T 2207/20021; G06T
2207/30201; G06T 2207/20081; G06T
7/246; G06T 7/74; G06T 19/006; G06K
9/00597; G06K 9/6218; G06K 9/628
USPC .............................................. 348/42–60, 158
See application file for complete search history.

(56) References Cited

U.S. PATENT DOCUMENTS

| | | | |
|---|---|---|---|
| 2013/0308099 A1* | 11/2013 | Stack ..................... | A61B 5/163 351/209 |
| 2015/0248470 A1* | 9/2015 | Coleman ............... | G06F 16/285 707/740 |
| 2015/0365655 A1 | 12/2015 | Oka et al. | |
| 2017/0193294 A1* | 7/2017 | Kawas ............... | G06K 9/00597 |
| 2017/0285736 A1 | 10/2017 | Young et al. | |
| 2017/0287112 A1* | 10/2017 | Stafford .................. | G06F 3/013 |
| 2018/0227630 A1 | 8/2018 | Schmidt et al. | |
| 2018/0011533 A9 | 11/2018 | Marggraff et al. | |
| 2019/0094963 A1 | 3/2019 | Nijs | |
| 2019/0251696 A1* | 8/2019 | Wang ................... | G02B 27/017 |
| 2020/0124845 A1* | 4/2020 | Smith .................. | G02B 27/017 |

OTHER PUBLICATIONS

Loschky, Lester C., and George W. Mc Conkie. Investigating Spatial Vision and Dynamic Attentional Selection Using a Gaze-Contingent Multiresolutional Display. Journal of Experimental Psychology: Applied 8.2 (2002): 99.

Loschky, Lester C., and George W. Mc Conkie. User Performance with Gaze Contingent Multiresolutional Displays, Proceedings of the 2000 Symposium on Eye Tracking Research & Applications. ACM, 2000.

* cited by examiner

ELECTRONIC DEVICE WITH FOVEATED DISPLAY AND GAZE PREDICTION

This application claims the benefit of U.S. provisional patent application No. 62/668,124 filed May 7, 2018, which is hereby incorporated by reference herein in its entirety.

BACKGROUND

This relates generally to devices with displays, and, more particularly, to devices with foveated displays.

Foveated displays divide the display area into multiple regions of different resolutions and/or visual quality and are able to change the location of these regions, based on a user's gaze. For instance, a first region centered around the user's gaze has high resolution and/or visual quality, a second region surrounding the first region has intermediate resolution and/or visual quality, and a third region surrounding the second region has low resolution and/or visual quality.

Human gaze, however, is subject to rapid, ballistic movements from one fixation point to another, a phenomenon known as saccades. Consider a scenario in which the user's gaze is currently aligned with the display's foveation center (i.e., the center of the region with the highest resolution). When a saccade occurs, the user's gaze may jump from its original gaze point on the display to a new saccadic landing position on the display, which can be on another region of the display with lower resolution and/or visual quality.

In practice, there is a finite delay between the instance the user's gaze has already arrived at the new saccadic landing position and the time the display updates its foveation center to match the user's new gaze point. This system latency, which causes the mismatch between the user's gaze position and foveation center, might result in a mismatched foveated zone (zone of high quality), thus causing the user to perceive reduced image quality.

SUMMARY

An electronic device may have a display. A gaze tracking system may gather information on a user's point of regard on the display (sometimes referred to herein as the "gaze-point"). Based on the gaze-point, control circuitry in the electronic device may produce image data for an image with multiple resolutions or quality. The term "or" in the previous sentence means that the display can either produce an image with multiple different resolutions or multiple different qualities, or that the display can produce an image with multiple different resolutions and multiple different qualities. A full-resolution and/or best quality area of the image overlaps the point of gaze. Lower resolution and/or low quality image areas are located in peripheral regions of the gaze-point. In contrast to resolution, "quality" may refer to the rendering quality (e.g., better texture rendering or triangulation) or the compression quality (e.g., more or less intense quantization). It is possible to exhibit different levels of rendering or compression quality at the same resolution.

During a saccade, the user's point of regard moves from a first gaze-point at the start/onset of the saccade to a second gaze-point at the end of the saccade. A gaze prediction system may analyze past and current gaze-points computed by the gaze tracking system in order to predict a saccadic landing position, before the gaze tracking system actually computes the second gaze-point. The display circuitry updates the image based on the predicted saccadic landing position so that the full-resolution area of the image overlaps with the predicted saccadic landing position to reduce visible foveation error.

In one suitable arrangement, the gaze prediction system may include a decision boundary determination circuit and an estimation circuit. The decision boundary determination circuit is configured to receive the gaze-point information and to map the received point of gaze information to a selected model in a plurality of models. The estimation circuit is configured to compute an estimated gaze displacement value that is used to predict the saccadic landing position. The decision boundary determination circuit and the estimation circuit may be jointly trained by training the decision boundary determination circuit for optimum clustering while training the estimation circuit for optimum regression.

In another suitable arrangement, the gaze prediction system may include an initial displacement estimation circuit, a decision boundary determination and lookup circuit, and a final displacement estimation circuit. The initial displacement estimation circuit receives the point of gaze information and produces an initial estimated gaze displacement value. The decision boundary determination and lookup circuit receives the initial estimated gaze displacement value, maps the received initial estimated gaze displacement value in addition to other indicators, to a selected model in a plurality of models, and outputs a corresponding index associated with the selected model. The final displacement estimation circuit receives the index from the decision boundary determination and lookup circuit and computes a corresponding final estimated gaze displacement value that is used to predict the saccadic landing position. The initial displacement estimation circuit and the final displacement estimation circuit may be trained by applying a regression process to a dataset (e.g., training data from other users and/or past data from the same user). The decision boundary determination and lookup circuit may be trained by applying a clustering process to the dataset.

In another suitable arrangement, the gaze prediction system may include a long-short-term-memory-based (LSTM-based) prediction network that is configured to predict the saccadic landing position. The LSTM-based prediction network may include an input layer, a long short term memory (LSTM) layer, a fully connected layer, a regression layer that is configured to predict the saccadic landing position, and an uncertainty estimator that is configured to output an uncertainty that is associated with the predicted saccadic landing position. The LSTM-based prediction network may output the predicted saccadic landing position based on features that are derived from gaze position information from a gaze tracking system, head position information from a head position tracking system, image data for the display, and tiredness information.

DETAILED DESCRIPTION

Electronic devices may be provided with displays and gaze tracking systems. In certain types of electronic devices, it may be desirable to display images for users over a wide angle of view. Displays that cover wide angles of view at high resolutions and/or visual quality may consume relatively large amounts of image data, consume lots of rendering power, and may therefore impose bandwidth, power, and computational burdens on the electronic devices. These bandwidth, power, and computational burdens may be reduced by using a display scheme in which high resolution (and/or high quality) images are displayed in alignment with the user's current point of gaze and in which low resolution images are displayed in the user's peripheral vision. The term "quality" may refer to the rendering condition (e.g., better texture rendering or triangulation) or the compression condition (e.g., more or less intense quantization). It is possible to exhibit different levels of rendering or compression quality at the same resolution. Display schemes such as these may sometimes be referred to as foveated display schemes.

The user's point of gaze can be tracked using gaze tracking (eye tracking) systems. The gaze tracking systems may gather information on a user's eyes such as information on the location of the centers of a user's pupils and information on corneal reflection locations (also known as Purkinje images), from which we can infer the direction in which the user is currently gazing. The direction in which the user is currently gazing can be used in determining the location on the display where the user is focused (the user's on-screen point of gaze). The user's point of regard on the display in addition to the gaze-direction can be used as an input to foveated display schemes to help align the user's current point of regard to the high resolution and/or quality image regions.

Electronic devices that include foveated displays and gaze tracking systems may include, for example, head-mounted displays, see-through augmented-reality glasses, cellular telephones, tablet computers, head-up displays in vehicles and other environments, laptop computers, desktop computers, televisions, wristwatches, and other suitable electronic equipment.

Figure 1:
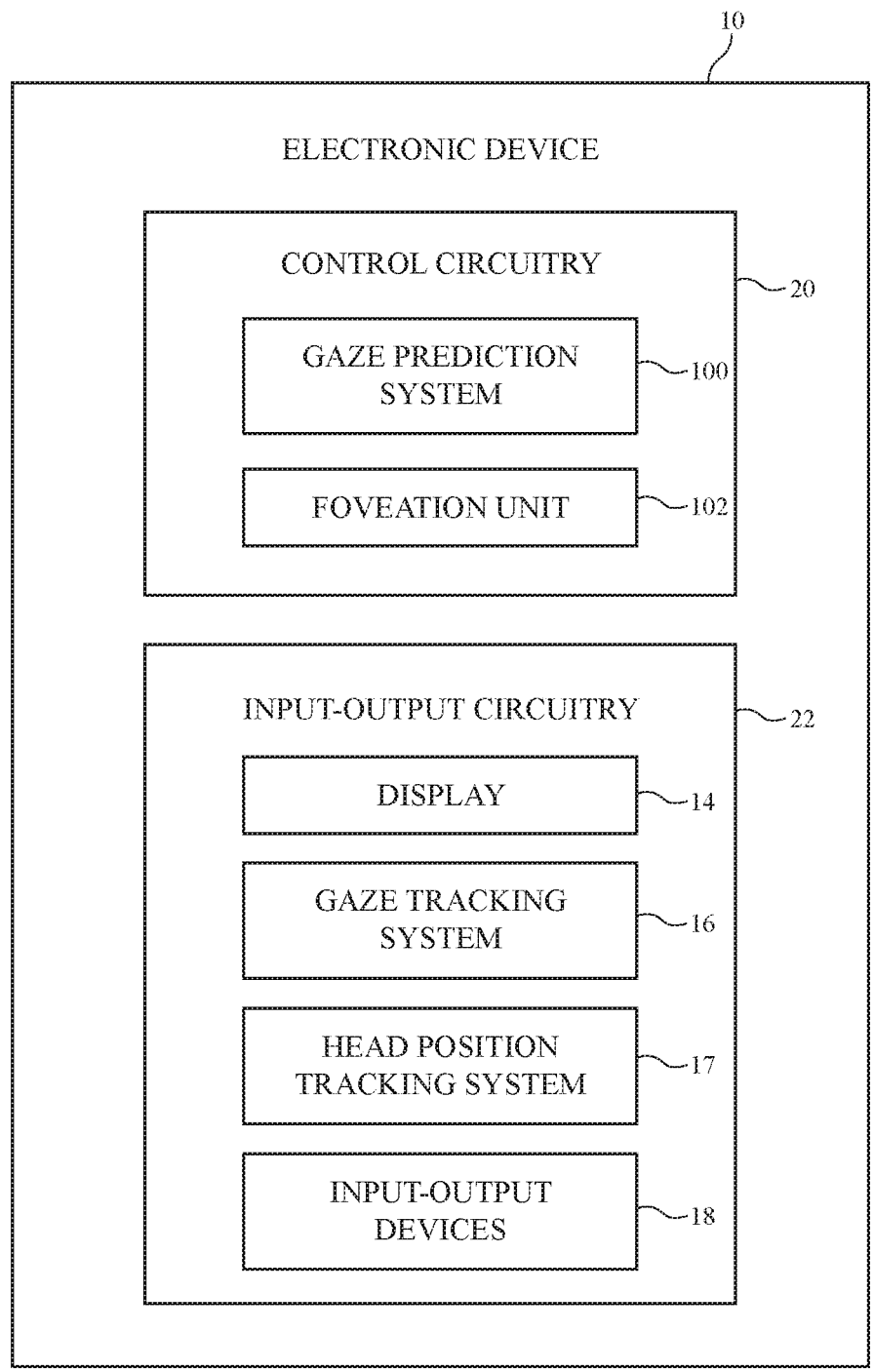
FIG. 1 is a schematic diagram of an illustrative electronic device with a foveated display in accordance with an embodiment.

A schematic diagram of an illustrative electronic device with a foveated display and a gaze tracking system is shown in FIG. 1. Electronic device 10 may be a head-mounted device (head-mounted display), a cellular telephone, a tablet computer, a head-up display, a laptop or desktop computer, a television, a wrist watch, or other electronic equipment. As shown in FIG. 1, electronic device 10 may have control circuitry 20. Control circuitry 20 may include storage and processing circuitry for controlling the operation of device 10. Circuitry 20 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 20 may be based on one or more microprocessors, microcontrollers, digital signal processors, baseband processors, power management units, audio chips, graphics processing units, application-specific integrated circuits, and other integrated circuits. Software code may be stored on storage in circuitry 20 and run on processing circuitry in circuitry 20 to implement control operations for device 10 (e.g., data gathering operations, operations involving the adjustment of components using control signals, operations involved in processing gaze tracking system data and data related to content being displayed for a user, operations involved in predicting the user's gaze point, operations for controlling the foveated display, etc.).

Device 10 may include input-output circuitry 22. Input-output circuitry 22 may be used to allow data to be received by device 10 from external equipment (e.g., a tethered or remote/wireless computer, a portable device such as a handheld device or laptop computer, or other electrical equipment) and to allow a user to provide device 10 with user input. Input-output circuitry 22 may also be used to gather information on the environment in which device 10 is operating. Output components in circuitry 22 may allow device 10 to provide a user with output and may be used to communicate with external electrical equipment. As shown in FIG. 1, input-output circuitry 22 may include a display such as display 14. Display 14 may be used to display images for a user of device 10. Display 14 may be an organic light-emitting diode display, a liquid crystal display, a liquid-crystal-on-silicon display, a plasma display, a microelectromechanical systems display, or any other suitable display.

Display 14 may present display content for a computer-generated reality such as virtual reality content or mixed reality content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Display 14 may be used to display content to a user for a wholly or partially simulated environment.

In addition to display 14, input-output circuitry 22 may include a gaze tracking system such as gaze tracking system 16 and also a head position tracking system 17. Gaze tracking (eye monitoring) system 16 may include image sensors, light sources, and/or other equipment that is used in monitoring the eyes of the user. Gaze tracking system 16 may include, for example, one or more visible and/or infrared cameras that face a user's eyes and capture images of the user's eyes. Head position tracking system 17 may include gyroscopes, accelerometers, light sources, and other devices jointly forming an inertia measurement unit (IMU) on device 10, which help determine the head movement, rotation, or orientation of the user.

During operation of device 10, control circuitry 20 may use gaze tracking system 16 and head position tracking system 17 to track a user's gaze and head rotation, respectively. Cameras and/or other sensors in system 16 may, for example, determine the location of a user's eyes (e.g., the centers of the user's pupils) and may determine the direction in which the user's eyes are oriented (the direction of the user's gaze, sometimes referred to as a measured point of gaze). By processing this information and information on the location of display 14, the location of the user's point of gaze on display 14 (sometimes referred to as the user's on-screen point of gaze) may be determined dynamically. Information on the location on display 14 where a user's gaze is currently directed and the amount of time that the user dwells on particular on-screen items and also information about the position of the user's head (e.g., whether the head is tilted, turned, or rotated) may be used as a form of user input to system 10. Gaze tracking system output and head tracking system output may also be used in conjunction with mouse clicks, screen taps and other touch screen or track pad touch gestures, voice commands, video game controller commands, and/or other user commands as a form of user input to device 10.

By determining the user's point of gaze, a foveation unit 102, which may include a graphics processing unit, a video compression unit, and display control circuitry, can expend processing effort on rendering the portion and/or compressing the video-content corresponding to the portion of the display where the point of gaze is located, at full resolution and(or) higher quality respectively, while rendering peripheral portions at one or more progressively lower resolutions and/or quality respectively. The portions of display 14 that are in a user's peripheral vision may be rendered with the lowest resolution and/or quality, and portions of display 14 that lie between the peripheral regions and the portion of display 14 that overlaps the user's point of gaze may be rendered with one or more intermediate levels of resolution and/or quality.

During operation, control circuitry 20 and graphics processing unit 102 may obtain information on the location of the user's current point of gaze from gaze tracking system 16 and can render different portions of each image to be displayed accordingly. Graphics processing unit 102 can obtain the current point of gaze of the user from system 16 and can, based on this gaze information, render portions of the image that are nearest to the point of gaze with a higher resolution and/or quality than portions of the image that are farther from the point of gaze (e.g., graphics processing unit 102 may produce foveated image data for display 14 based on point-of-gaze information received from gaze tracking system 16). This reduces the amount of processing (complexity) that GPU 102 has to perform for each frame refresh operation.

Additionally, control circuitry 20 and the video compression unit nestled within unit 102 may obtain information on the location of the user's current point of gaze from gaze tracking system 16 and can "compress" different portions of each image to be displayed accordingly. Before transmitting data for a given image to be displayed on display 14 from graphics processing unit 102, the video compression unit 102 can obtain the user's current point of gaze from system 16 and can, based on this gaze information, compress (e.g., using video or image compression) those portions of the image that are nearest to the point of gaze with a higher quality than portions of the image that are farther from the point of gaze. This reduces the amount of bandwidth or the amount of transmission time (often wireless transmission) from control circuitry 20 to display 14.

The human gaze, however, is subject to rapid, jerky movements shifting from one fixation point to another, a phenomenon known as saccades. Saccadic movements of the human eye can make it more challenging for graphics processing unit 102 to render foveated image data that keeps up with the user's actual point of gaze. In accordance with an embodiment, a gaze prediction system such as gaze prediction system 100 is provided that helps gaze tracking system 16 predict the saccadic landing position (the user's final point of gaze) during a saccade. The gaze prediction system 100 predicts the saccadic landing position before gaze tracking system 16 identifies the user's actual final point of gaze at the end of the saccade. Predicting the saccadic landing position in this way helps graphics processing unit 102 render foveated image data that keeps up with the user's actual point of gaze, which in turn reduces potential mismatch between the user's current point of gaze and the portion of display 14 with higher resolution, so the user will not perceive any reduced image resolution (or quality). In the example of FIG. 1, gaze prediction system 100 is shown as being a part of control circuitry 20. This is merely illustrative. In other suitable embodiments, gaze prediction system 100 can be considered as part of input-output circuitry 22 or even as a part of gaze tracking system 16.

User behavior such as head rotation or position information may also be gathered using sensors and other input devices in input-output devices 18. Input-output devices 18 may include, for example, position and motion sensors (e.g., compasses, gyroscopes, accelerometers, and/or other devices for monitoring the location, orientation, and movement of device 10), may include force sensors, temperature sensors, touch sensors, buttons, capacitive proximity sensors, light-based proximity sensors, other proximity sensors, strain gauges, gas sensors, pressure sensors, moisture sensors, magnetic sensors, and other sensors, may include audio components such as microphones for gathering voice commands and other audio input, and may include speakers for providing audio output (e.g., for providing sound to the left and right ears of a user). If desired, input-output devices 18 may include haptic output devices (e.g., vibrating components), light-emitting diodes and other light sources, and other output components. Circuitry 22 may include wired and wireless communications circuitry that allows device 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
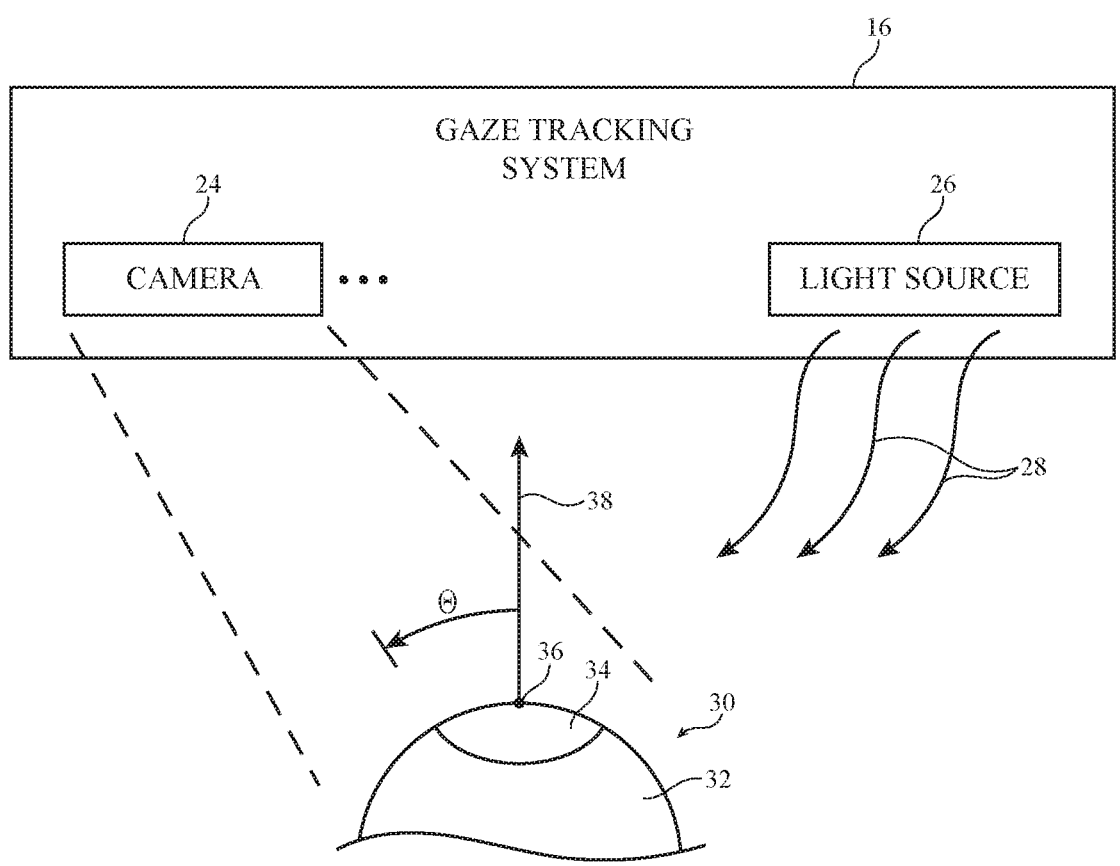
FIG. 2 is a diagram an illustrative gaze tracking system in accordance with an embodiment.

FIG. 2 is a diagram showing how gaze tracking system 16 may gather eye position information on a user's eye 30. In a typical scenario, gaze tracking system 16 may include components for simultaneously monitoring two eyes such as eye 30 of FIG. 2. As shown in FIG. 2, system 16 may include one or more image sensors such as camera(s) 24. Each camera 24 may be focused on the front of a user's eye such as eye 30 so that the characteristics of the user's eye can be measured. One or more light-emitting diodes, lasers, lamps, and/or other light-emitting components may be used to form a light source for gaze tracking system 16 (see, e.g., light source 26).

During operation, light source 26 may emit light 28. For example, light source 26 may emit multiple beams of light 28 towards the user's eye 30 (e.g., 2-10 beams of light, 6 beams of light, 4-7 beams of light, 4-9 beams of light, etc.). Light 28 may be reflected off of the surface of eye 30. Camera 24 may gather images of eye 30. Information on the appearance of eye 30 (e.g., iris information, pupil information, blood vessel information, etc.) and/or information on reflected light (e.g., one or more light beams) from cornea 32 and other portions of eye 30 may be used by control circuitry 20 to determine the location of pupil center 36 of pupil 34 and the direction in which the user is currently gazing (gaze direction 38). The eye position information (pupil center information, eye orientation, gaze direction, etc.) that is gathered by gaze tracking system 16 and information on the location of display 14 relative to system 16 and eyes 30 may be used by control circuitry 50 to dynamically identify the user's point of gaze on display 14.

Figure 3:
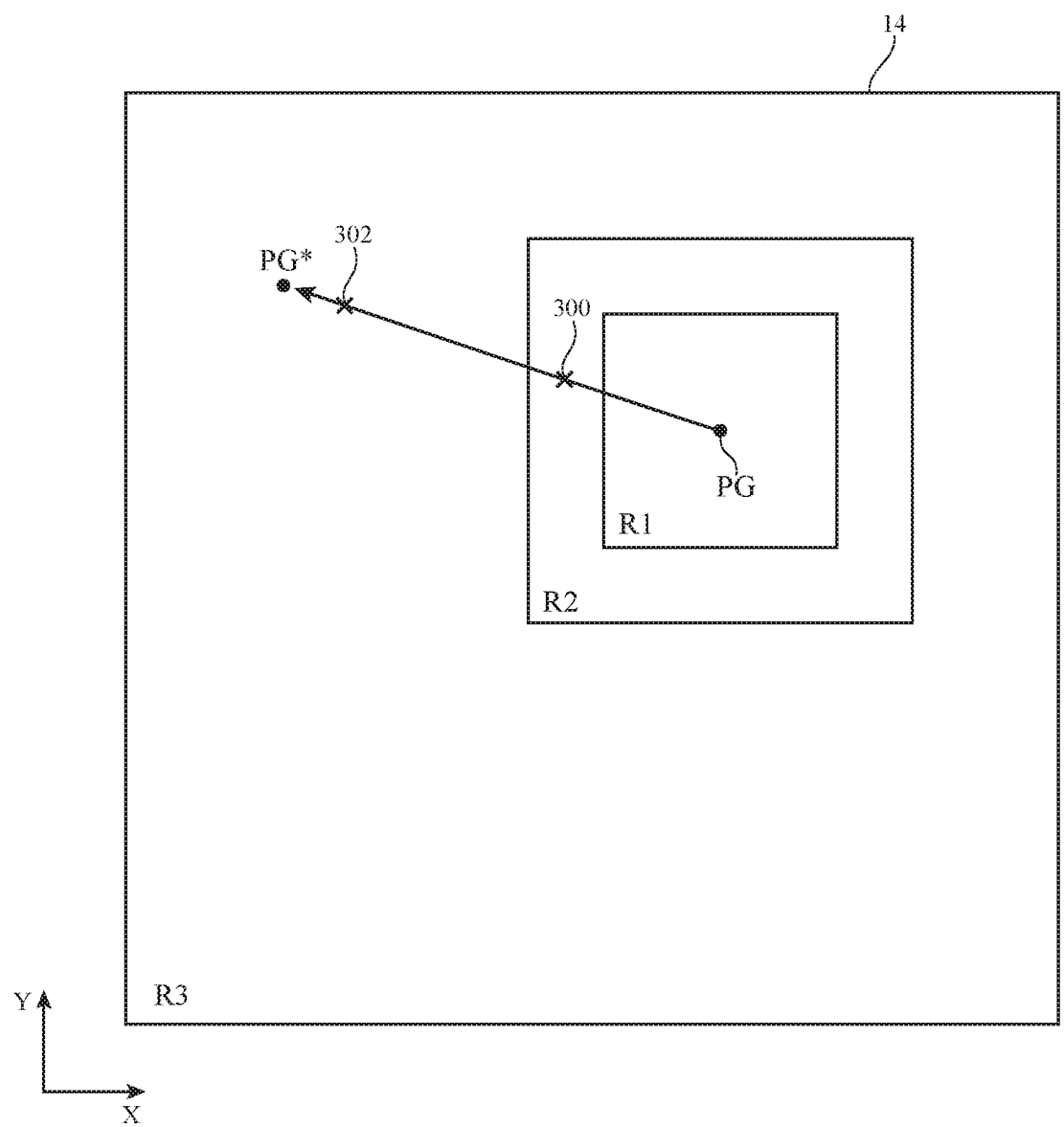
FIG. 3 is a diagram of an illustrative foveated display in accordance with an embodiment.

An illustrative example of a foveated image being displayed on display 14 is shown in FIG. 3. In the example of FIG. 3, display 14 has a rectangular outline, which is merely illustrative. In general, display 14 may have curved or circular edges or any suitable outline. Based on gaze tracking information from gaze tracking system 16, graphics processing unit 102 may determine that a user's current point of gaze is located at point PG (e.g., in the upper right corner of display 14 in the example of FIG. 3). Based on this location, graphics processing unit 102 may render image data in full resolution and/or quality for region R1 of FIG. 3 (an area that overlaps PG). Peripheral image data (e.g., image data for region R3 of FIG. 3) may be rendered at a reduced resolution and/or quality (e.g., ¼ of the full resolution). Intermediate areas that lie between full resolution area R1 and reduced resolution area R3 may be rendered at intermediate resolutions and/or quality (see, e.g., region R2 of display 14 at ½ of the full resolution). In general, any suitable number of different resolutions and/or quality may be used in rendering foveated image data for display 14 in device 10. The use of three different areas with three respective different resolutions and/or quality in the example of FIG. 3 is merely illustrative.

As the user views visible content on display 14, point-of-gaze location PG will jump to different regions on display 14. The graphics processing unit, display control circuitry, and the video compression units within unit 102 will need to adjust the locations of the high resolution and/or quality and lower resolution and/or quality areas for which image data is being rendered with different resolutions and/or quality to keep up with the user's current point of gaze location. In the example of FIG. 3, consider a scenario where the user's point of gaze jumps from initial point PG to final point PG*. The final point PG* of the saccade is sometimes referred to as a saccadic landing position or saccadic landing location. Saccades can be fairly rapid, so if care is not taken, the gaze tracking system will not accurately track the user's gaze and might assume that the user's current gaze location is at point 300. This mismatch between PG* and point 300 may be due to a finite eye-to-rendering latency of the gaze tracking and display circuitry. With a gaze prediction system such as the gaze prediction system 100 of FIG. 1, a more accurate gaze location can be determined in real-time, as shown by predicted gaze location at point 302, which is much closer to PG*. Mitigating the eye-to-rendering latency (sometimes referred to as gaze tracking latency) in this way reduces the risk of "visible foveation error."

Figure 4:
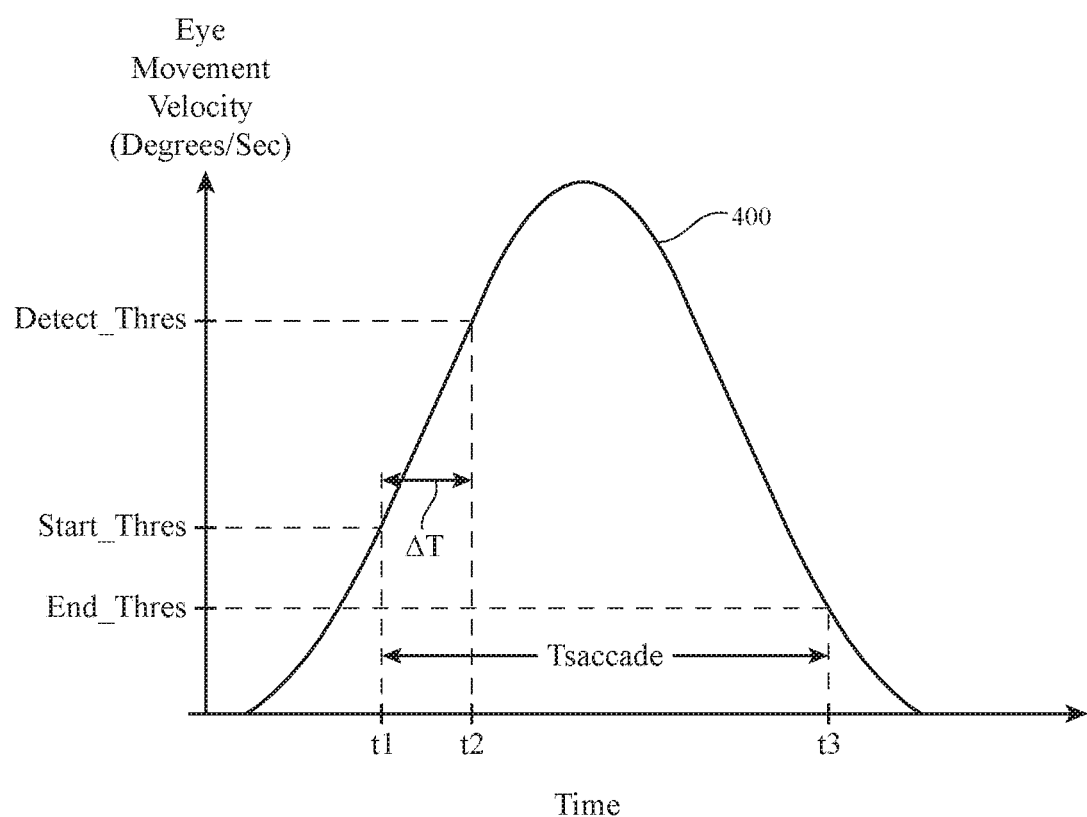
FIG. 4 is a timing diagram illustrating various conditions for detecting a saccade in accordance with an embodiment.

FIG. 4 is a timing diagram that illustrates the method used for detecting a saccade. Control circuitry 20 is continuously monitoring the velocity of eye-movement. The eye movement velocity may be computed based on the displacement after saccade start and the time after saccade start. Eye-movement velocity may be measured in terms of degrees of eye displacement (see, degree $\theta$ by which gaze position 38 changes in FIG. 3) per second. Curve 400 represents eye movement velocity plotted against time for an exemplary saccade. As shown in FIG. 4, curve 400 exceeds a saccade start threshold level (Start_Thres) at time t1, exceeds a saccade detection threshold level (Detect_Thres) at time t2, and then falls below a saccade end threshold level (End_Thres) at time t3. The duration of the saccade Tsaccade may be defined by the period of time between time t1 (when curve 400 exceeds the start threshold) and time t3 (when curve 400 falls below the end threshold).

In general, eye tracking data gathered by gaze tracking system 16 can be fairly noisy, so filtering the data can help determine when gaze prediction is actually needed. Proper filtering can be achieved by setting certain conditions that has to be met before gaze tracking system 16 confirms that a valid saccade has occurred. In one suitable arrangement, gaze tracking system 16 may determine that gaze prediction has to be performed only if the period $\Delta T$ between time t1 (when curve 400 exceeds the start threshold) and time t2 (when curve 400 exceeds the detection threshold) exceeds a predetermined duration.

As an example, the start threshold may be set to 80 degrees/sec, the detection threshold may be set to 100 degrees/sec, and the predetermined duration may be set to 30 ms. In other words, the detected eye movement velocity will have to exceed 100 degrees/sec with a backward threshold of 80 degrees/sec and has to last for at least 30 ms before gaze detection system 16 will verify a valid saccade.

Figure 5:
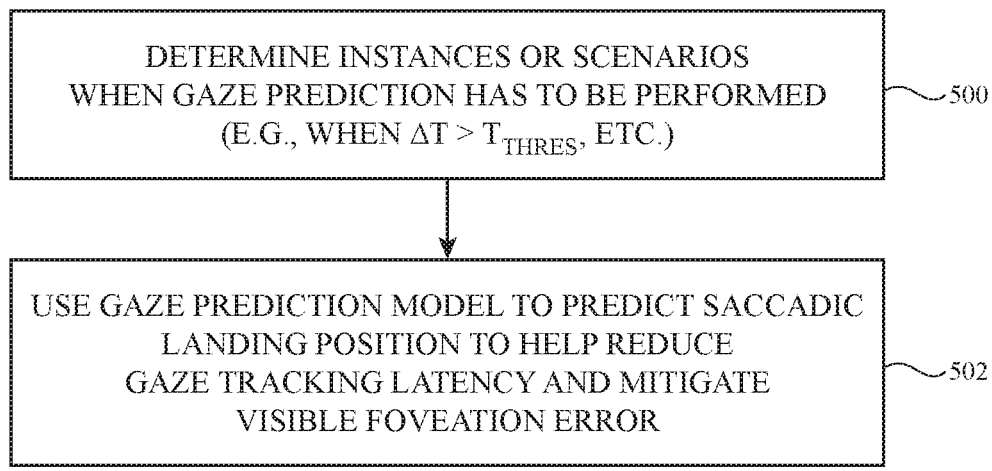
FIG. 5 is a flow chart of illustrative steps for operating a foveated display with gaze prediction in accordance with an embodiment.

FIG. 5 is a flow chart of illustrative steps for performing gaze prediction in device 10 with foveated display 14. At step 500, gaze tracking system 16 may generate eye movement or gaze displacement data, which is fed to gaze prediction system 100. Gaze prediction system 100 may analyze the received gaze displacement data to detect instances or scenarios when gaze prediction has to be performed.

The example of FIG. 4 where prediction is activated only when ΔT exceeds some predetermined duration is only one of the several conditions that has to be satisfied for the prediction system to be activated. Another condition may require Tsaccade to be greater than another predetermined amount, which may be at least 2 times greater than ΔT, at least 3 times greater than ΔT, at least 4 times ΔT, etc. Other exemplary conditions that need to be met for gaze prediction might include: limiting the allowed angular deviation of gaze-points along the (otherwise ideally straight) saccadic path to 30°, limiting Tsaccade to no more than 150 ms, requiring eye movement to be strictly monotonically increasing with some margin of error, etc. Gaze prediction should not be performed, however, if the gaze behavior is part of an eye blink or partial lid closure, a smooth pursuit eye movement (SPEM), or some other unforeseen condition where the eye movement trajectory appears to deviate from the ideal modelled case. For example, an eye blink can be detected if the eye movement is straight downwards or straight upwards at angles between 80°-120° with displacement speeds exceeding 700 degrees/sec. These numerical figures are merely illustrative. The exact thresholds may be dependent on the make and accuracy of the eye-tracking equipment used. A smooth pursuit eye movement is a scenario where the eye is smoothly tracking a certain object moving in the screen, which is different from a saccade. Unforeseen conditions may include scenarios not observed during training or when the eye trajectory is different from what is expected (e.g., if the eye trajectory is no longer a sigmoid function).

In response to detecting a valid saccadic movement and determining that gaze prediction has to be performed, gaze prediction system 100 may use a gaze prediction model to predict the final saccadic landing position to help reduce gaze tracking latency and reduce "visible foveation error" for the user. In general, the gaze prediction model may be created from a large offline dataset having training gaze data or may be continuously refined using past gaze data from the user. The gaze prediction model may include a plurality of smaller localized models or sub-models for accurately predicting the saccadic landing position for different categories of saccadic movements.

Figure 6:
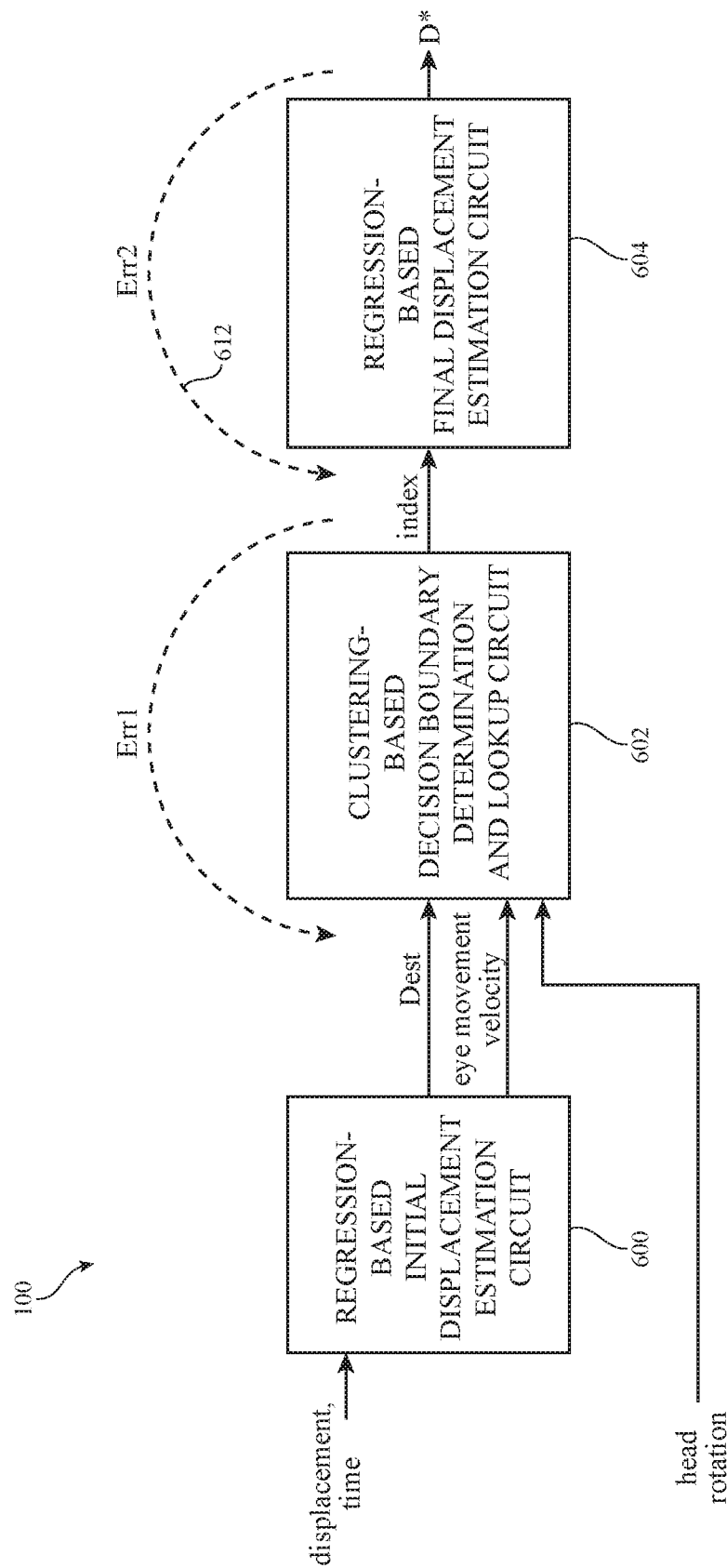
FIG. 6 is a diagram showing one suitable implementation of a gaze prediction system in accordance with an embodiment.

FIG. 6 is a diagram showing one suitable modeling approach for implementing gaze prediction system 100. As shown in FIG. 6, gaze prediction system 100 may include an initial displacement estimation circuit such as initial displacement estimation circuit 600, a decision boundary determination and lookup circuit such as decision boundary determination and lookup circuit 602, and a final displacement estimation circuit such as final displacement estimation circuit 604.

Initial displacement estimation circuit 600 may receive gaze displacement and timing information from gaze tracking system 16, which allows gaze prediction system 100 to accurately track the amount of gaze displacement after saccadic start over time. Circuit 600 may use the received gaze displacement information (i.e., the displacement from saccade start) and the received timing information (i.e., the time after saccade start) to generate the eye movement velocity as an output to circuit 602. Circuit 600 may further be configured to output an initial displacement estimate Dest by modeling all saccades using a general sigmoidal function (as an example):

$$Dest = d*(1+e^{\alpha t + H(t)+b}) \quad (1)$$

where d represents the gaze displacement input, and where t represents the time after saccadic start. H(t) indicates a function, whose value is dependent on the component of the speed of head movement, along the direction of the eye-saccade. In the simplest case, the function H(t) may be simply equal to zero, in which case, the effects of head movement are completely ignored. In other cases, the value of H(t) maybe dependent on the component of the speed of head movement along the direction of the saccade. A sigmoid function in its basic form, is a bounded, differentiable, real value function that is defined for all real input values and has a non-negative derivative at each point. The general sigmoidal function of equation (1) has a set of coarse parameters [a, b] which can be used to compute Dest. Coarse parameters [a, b] may be determined using regression approaches on training data or user data. Regression approaches that may be used by circuit 600 include linear regression, logistic regression, polynomial regression, stepwise regression, ridge regression, lasso regression, and other suitable techniques. These regression techniques may, if desired, be implemented using machine learning. Estimate Dest computed in this way may represent a coarse estimation of the saccadic landing position.

The example above in which equation (1) is used to model saccadic behaviors is merely illustrative. In general, other functions such as the Raised cosine function, Gompertz function, hyperbolic tangent function, arctangent function, Guddermannian function, Smoothstep function, Gamma function, Occulomotor Plant model, and/or other logistic functions can be used to model a saccade.

Figure 7A:
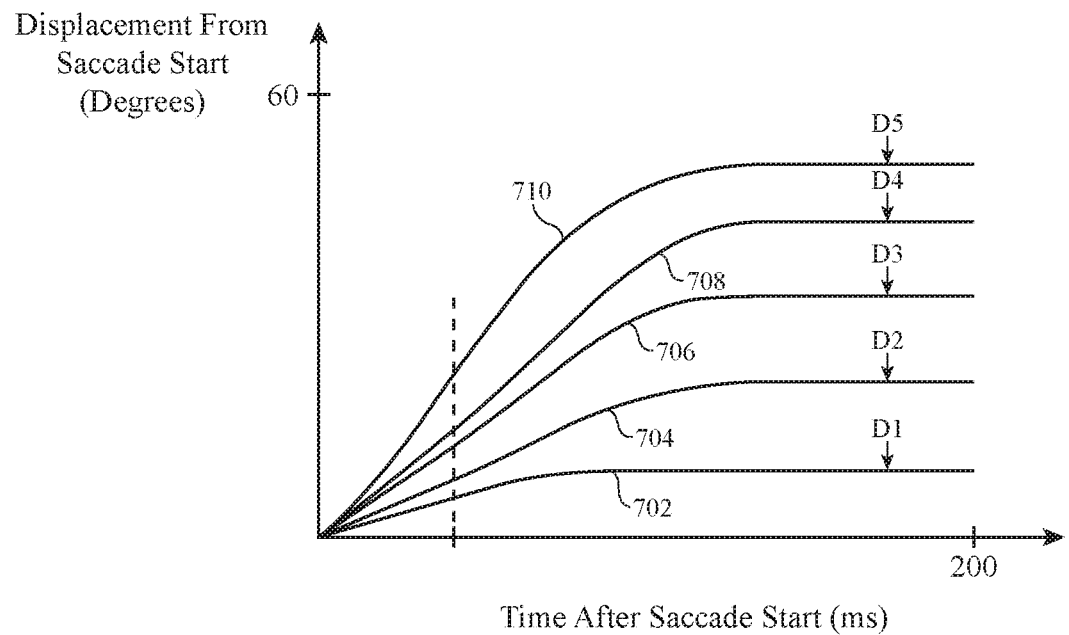
FIG. 7A is diagram that plots gaze displacement as a function of time after saccadic onset in accordance with an embodiment.

Decision boundary determination and lookup circuit 602 may receive an initial Dest and the eye movement velocity from circuit 600 and may also receive the head rotation information from head tracking system 17. FIG. 7A is diagram that plots gaze displacement as a function of time after saccadic onset. As shown in FIG. 7A, curves 702, 704, 706, 708, and 710 may represent different saccadic movements, each of which can be modeled as a sigmoidal function. For example, curve 702 may have a final saccadic displacement D1; curve 704 may have a final saccadic displacement D2; curve 706 may have a final saccadic displacement D3; etc. The displacement curves of FIG. 7A may be obtained from an offline training dataset and/or from past user data.

Figure 7B:
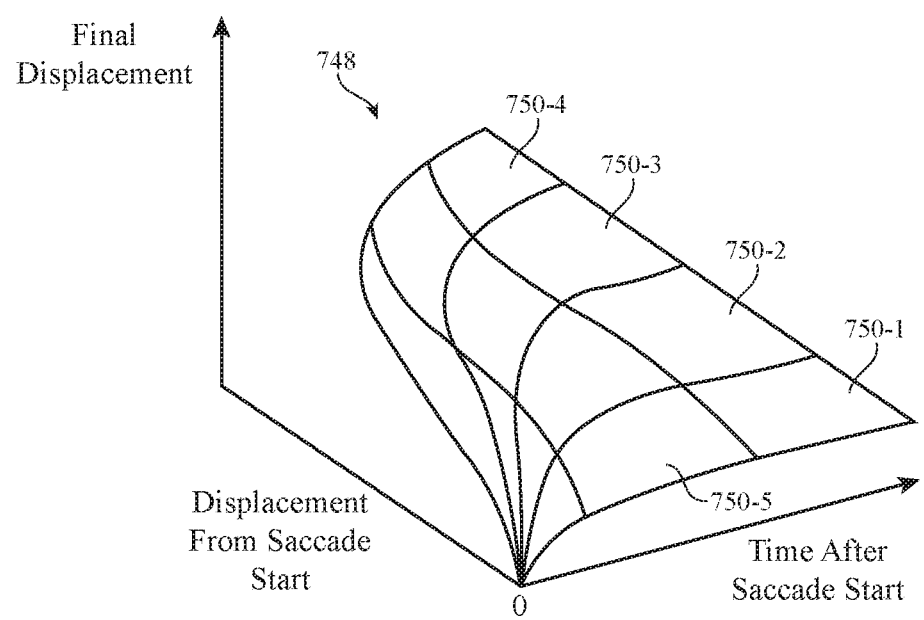
FIG. 7B is a diagram showing how the curves in FIG. 7A can collectively be grouped into multiple localized models in accordance with an embodiment.

The example of FIG. 7A showing only five different curves is merely illustrative. In general, circuit 602 may be modeled using hundreds or even thousands of curves. These curves, if plotted along a third axis by its final saccadic displacement value may collectively form a surface such as surface 748 as shown in FIG. 7B. In particular, circuit 602 may be configured to divide surface 748 into multiple groups (see, e.g., regions 750-1, 750-2, 750-3, 750-4, 750-5, etc.) by first determining the boundaries for each of these regions during a training phase. Data grouping or clustering approaches that may be used by circuit 602 include k-means clustering, fuzzy c-means clustering, hierarchical clustering, Gaussian mixture models, and other suitable techniques. The three-dimensional clustering of FIG. 7B based on displacement from saccade start, time after saccade start, and the final displacement value is merely illustrative. If desired, the clustering may include a fourth dimension by taking into account head rotation information produced by the head position tracking system to further refine the model for increased accuracy.

Circuit 602 may be trained using a naïve, unsupervised approach. Here, no importance whatsoever is given, to the error Err1 generated at the output of circuit 602, and nearby regions in the above-mentioned 3-dimensional surface 748 are grouped together into a single decision space (read as index). After circuit 602 is trained, circuit 602 is capable of mapping the received Dest to a particular one of the multiple regions. Each of the different regions may be assigned a respective index, which is provided as an output of circuit 602. Circuit 602 operated in this way to output an index is therefore sometimes referred to as a lookup circuit.

Each of the different regions 750 can then be modeled using a different sub-model (e.g., as a different sigmoidal function). The different sigmoidal functions corresponding to the different localized regions each have their own set of fine parameters [a, b]. Fine parameters [a, b] may be determined by applying regression techniques to training data or past user data. Regression approaches that may be used by circuit 604 include linear regression, logistic regression, polynomial regression, stepwise regression, ridge regression, lasso regression, and other suitable techniques. These regression techniques may, if desired, be implemented using machine learning.

Each sub-model "i" nestled within circuit 604 may be individually trained as a standalone block, by minimizing error Err2=[D*(i)−Dtrain(i)]^2, where Dtrain(i) is the ground-truth displacement that was expected for that block. Dtrain(i) is either obtained from the training dataset or using past gaze-data from the same observer. D*(i) on the other hand, is the actual displacement value that the circuit is currently generating, for members of that block, in its current trained state. This training process thus computes fine parameters a and b for each of the sub-models. After circuit 604 is trained, circuit 604 is capable of using the received index "i" (corresponding to one single nestled sub-model) to look up the corresponding fine parameters [a, b] and then to compute the final displacement estimation D*. Final displacement estimate D* computed in this way can then be combined with other gaze data (e.g., the direction of gaze movement and the starting position of the saccade) to predict the final saccadic landing position. The graphics processing unit, video compression unit, and display control circuitry within unit 102 (FIG. 1) can then use this information to adjust the locations of the high resolution and lower resolution areas for which foveated image data is being rendered to better keep up with the user's current point of gaze.

Figure 8:
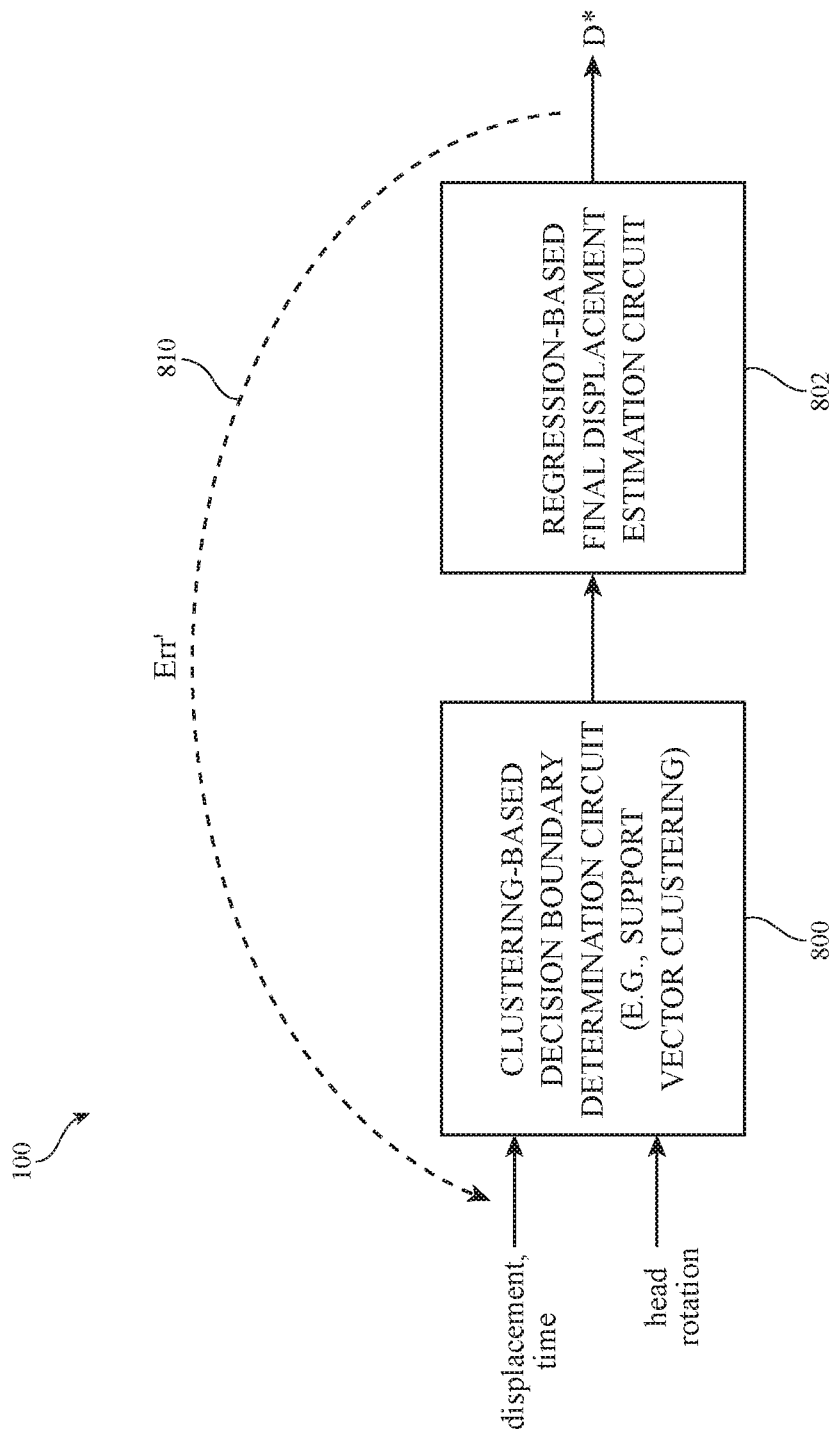
FIG. 8 is a diagram showing another suitable implementation of a gaze prediction system in accordance with an embodiment.

FIG. 8 is a diagram showing another suitable implementation of gaze prediction system 100. As shown in FIG. 8, gaze prediction system 100 may include a decision boundary determination circuit such as decision boundary determination circuit 800, and a final displacement estimation circuit such as final displacement estimation circuit 802. Decision boundary determination circuit 800 may receive gaze displacement and timing information from gaze tracking system 16 and the head rotation information from system 17, which allows gaze prediction system 100 to track the amount of gaze displacement after saccade start over time.

In contrast to the embodiment of FIG. 6 where circuits 602 (unsupervised) and 604 (supervised) are trained separately, circuits 800 and 802 of FIG. 8 are trained together or jointly, as indicated by error feedback path 810 (e.g., by minimizing overall error Err' during training). In other words, the estimate D* produced from the final block 802 may be compared with the expected displacement from the training dataset (Dtrain) to compute an error metric: (D*−Dtrain)^2. This in turn is an indicator of the imperfections existing in blocks 800 and 802 taken together. Thus, a joint optimization process may be used to "supervise-train" the clustering process in block 800 and the regression in block 802 together. During the training phase, circuit 800 may be configured to organize a dataset (e.g., training data or past user data) into different groups using various data grouping or clustering approaches to determine decision boundaries for the different groups, which may include support vector clustering, kernel k-means clustering, and other suitable techniques. As examples, circuit 800 may divide the data set into at least 10 different clusters, at least 20 different clusters, at least 30 different clusters, etc.

During training phase, circuit 802 may be configured to determine a set of fine parameters [a, b] for each of the different clusters organized by circuit 800. Fine parameters [a, b] may be determined by applying regression techniques to the dataset (e.g., training data or past user data). Regression approaches that may be used by circuit 802 include linear regression, logistic regression, polynomial regression, stepwise regression, ridge regression, lasso regression, and other suitable techniques.

In certain embodiments, circuits 800 and 802 may be trained using machine learning techniques such as using a neural-network-based learner (e.g., a convolutional neural network, a recurrent neural network such as a long short-term memory network, a feedforward neural network, a radial basis function neural network, etc.). By simultaneously/jointly training circuits 800 and 802, the decision boundaries determined by circuit 800 and the fine parameters determined by circuit 802 can be tuned together to help minimize err Err', which can help improve the overall accuracy of gaze prediction.

After circuits 800 and 802 have been trained, the displacement and timing information can be fed into gaze prediction system during normal user operation, and circuit 802 will compute a corresponding final displacement estimation D*. Final displacement estimate D* computed in this way can then be combined with other gaze data (e.g., the direction of gaze movement, head rotation information, and the starting position of the saccade) to predict the final saccadic landing position. The graphics processing unit, video compression unit, and the display control circuitry within unit 102 (FIG. 1) can then use this information to adjust the locations of the high resolution/quality and lower resolution/quality areas for which foveated image data is being rendered to better keep up with the user's current point of gaze location.

The embodiments of FIGS. 6 and 8 where gaze prediction system 100 is trained based on using displacement and timing information and head rotation information as primary inputs is merely illustrative. If desired, other input features that can be used to further optimize the accuracy of the model in predicting the trajectory of the saccade may include taking into account long-term and short-term dependencies in the data, user tiredness, specific user characteristics, head position/rotation information, etc.

Figure 9:
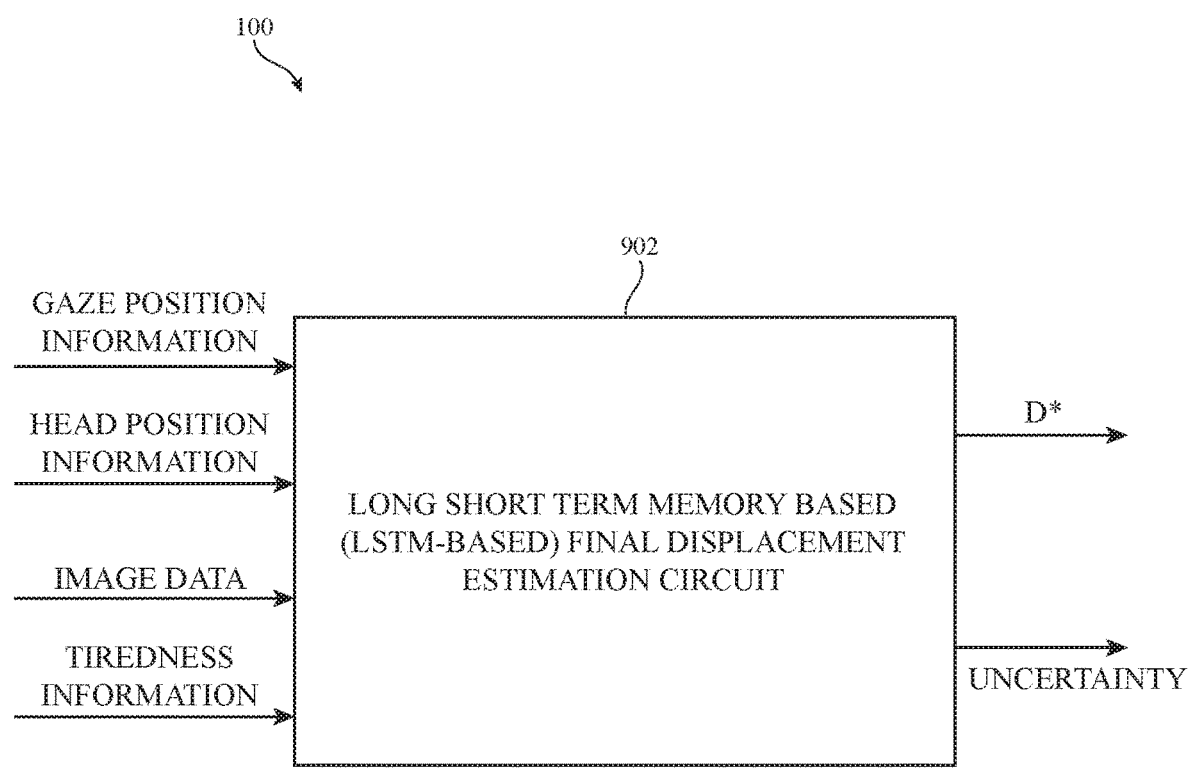
FIG. 9 is a diagram showing another suitable implementation of a gaze prediction system that uses a LSTM-based final displacement estimation circuit in accordance with an embodiment.

FIG. 9 is a schematic diagram of a gaze prediction system 100 that includes a long short-term-memory-based (LSTM-based) final displacement estimation circuit 902. LSTM-based final displacement estimation circuit 902 helps gaze tracking system 16 predict the saccadic landing position (the user's final point of gaze) during a saccade. The gaze prediction system 100 predicts the saccadic landing position before gaze tracking system 16 identifies the user's actual final point of gaze at the end of the saccade. Predicting the saccadic landing position in this way helps graphics processing unit 102 render foveated image data that keeps up with the user's actual point of gaze, which in turn reduces potential mismatch between the user's current point of gaze and the portion of display 14 with higher resolution, so the user will not perceive any reduced image resolution (or quality).

The LSTM-based final displacement estimation circuit 902 may receive gaze displacement information, head-motion information, image data, event type (describing what kind of eye/head movement, such as saccade, smooth pursuit, vestibulo-oscular reflex, optokinetic nystagmus, blink, etc. is underway) and tiredness information. The gaze displacement information (sometimes referred to as gaze position information) may be received from gaze tracking system 16. Cameras and/or other sensors in system 16 may, for example, determine the location of a user's eyes (e.g., the centers of the user's pupils) and may determine the direction in which the user's eyes are oriented (the direction of the user's gaze, sometimes referred to as a measured point of gaze). The information regarding the location of the user's eyes and the direction in which the user's eyes are oriented may be provided as input to the LSTM-based final displacement estimation circuit.

The head position information may be received from head position tracking system 17. The head position tracking system 17 that provides the head position information to LSTM-based final displacement estimation circuit 902 may include gyroscopes, accelerometers, light sources, and other devices jointly forming an inertia measurement unit (IMU) on device 10. The head position information may help determine the head movement, rotation, or orientation of the user.

Image data may also be provided as input to LSTM-based final displacement estimation circuit 902. The image data may be the image data that is provided to display 14 in electronic device 10 to be presented to the user of the electronic device. The image data may be analyzed to help estimate the final displacement of a saccade. The image data may provide information on where objects of interest are located on the display as well as the type of content on the display. These factors may influence the final landing position of a saccade (e.g., because the saccade is more likely to terminate on an object of interest on the display).

The LSTM-based final displacement estimation circuit 902 may also receive tiredness information as an input. Saccadic tendencies may be influenced by the tiredness of the user. For example, the frequency at which a user has saccades may change as a function of the user's tiredness and the length of each saccade may change as a function of the user's tiredness. The tiredness information may include the length of time elapsed since the user started using the electronic device (e.g., the amount of time the electronic device has been used in the current use session). Tiredness may be proportional to the length of time the user has used the electronic device. Additional information correlated with tiredness (e.g., the total length of time across multiple sessions the user has used the electronic device within a set period of time, information regarding the user's sleep patterns, etc.) may also be received by the LSTM-based final displacement circuit.

Using the received information, the LSTM-based final displacement estimation circuit may output a final displacement estimation D*. Final displacement estimation D* may estimate of the total displacement of the saccade (or the total remaining displacement of the saccade). This information may then be combined with other gaze position information (e.g., the direction of gaze movement and the starting position of the saccade) to predict the final saccadic landing position. The final saccadic landing position may then be used by foveation unit 102 to render high-resolution image data for the area of the display corresponding to the final saccadic landing position.

LSTM-based final displacement estimation circuit 902 may also output an uncertainty value that is associated with the final displacement estimation D*. The uncertainty value may be a numerical assessment of the uncertainty of the final displacement estimation. The uncertainty may be used by foveation unit 102 to render image data for the display. For example, the amount of high-resolution image data rendered may be influenced by the uncertainty of the final displacement estimation. If the uncertainty is low, the landing position of the user's point of gaze is known to a high degree of certainty and the high-resolution image data may be rendered only for this known landing position. If the uncertainty is higher, the landing position of the user's point of gaze could be at any position within a larger area of display. This larger portion of the display may be rendered with high-resolution image data to increase the probability that the landing position of the user's point of gaze is on a portion of the display with a high-resolution. In general, the uncertainty may be used in any desired manner by foveation unit 102 to influence the image data that is rendered for the display.

Figure 10:
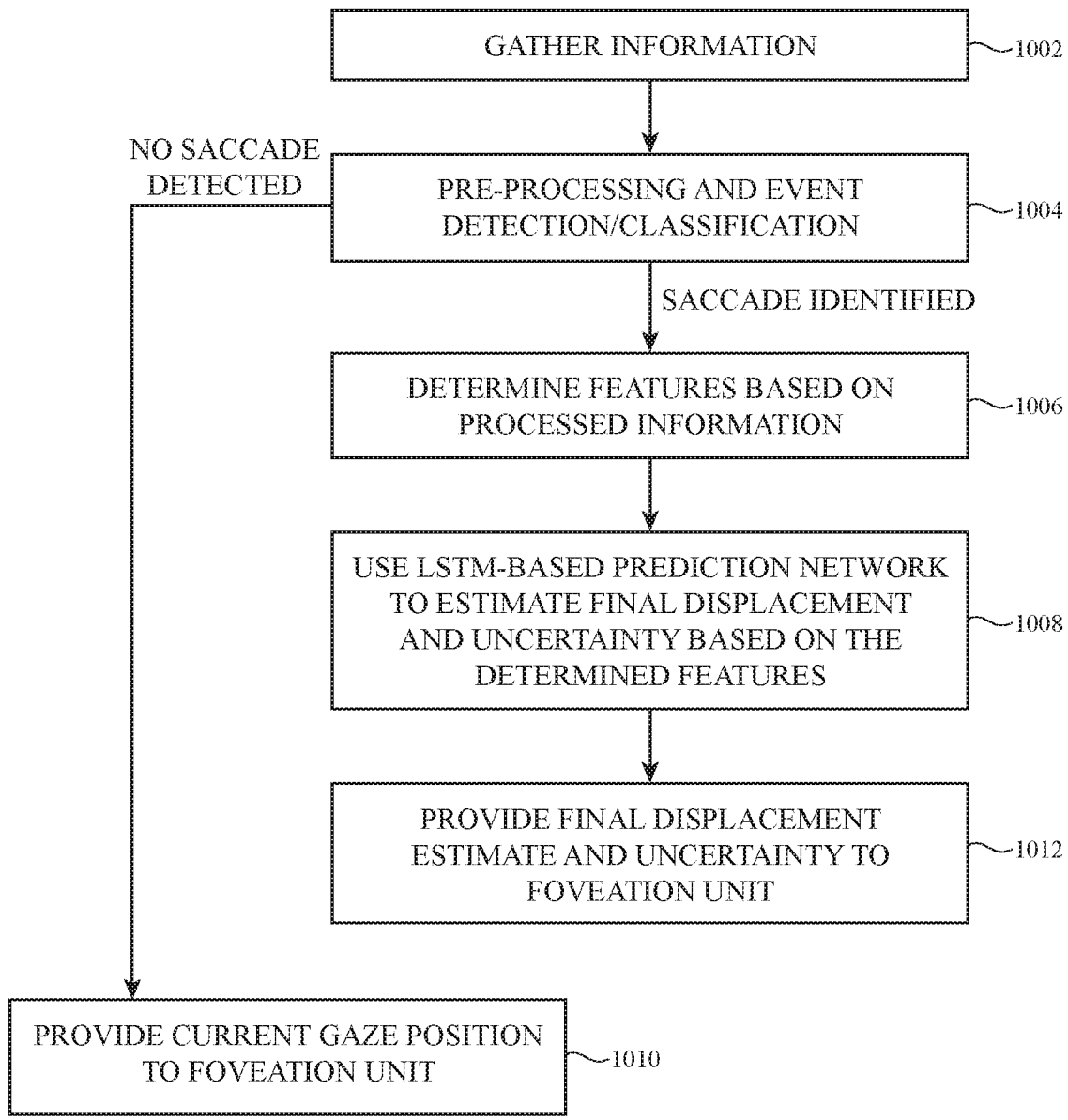
FIG. 10 is a flow chart of illustrative steps for operating the LSTM-based final displacement estimation circuit of FIG. 9 in accordance with an embodiment.

FIG. 10 is a diagram of illustrative method steps that may be used to operate a LSTM-based final displacement estimation circuit of the type shown in FIG. 9. As shown in FIG. 10, the LSTM-based final displacement circuit may gather information at step 1002. Gathering the information may include gathering gaze position information (e.g., from gaze tracking system 16), gathering head position information (e.g., from head position tracking system 17), gathering image data, and gathering tiredness information.

After gathering the information in step 1002, pre-processing and event detection/classification may occur in step 1004. Event detection/classification may include identifying different eye/head movement types such as fixation, saccade, smooth pursuit, vestibulo-ocular reflex (VOR), blinks, optokinetic nystagmus (OKN), etc. Pre-processing may include initial processing of the received information to place the data in a better format for further analysis. For example, interpolation of the data may be performed to fill in any missing data points or to place samples at regular intervals if the sampling rate for the gaze tracking system or head position tracking system is variable. The data may be filtered to smooth the data (e.g., using a Savitzky-Golay filter, median filter, exponential moving average, bilateral filter, wavelet signal denoising filter, or any other desired type of filter). A moving average of the data may be obtained to help smooth the data. Down-sampling and/or up-sampling may also be performed. Some initial properties may be determined during the pre-processing step. For example, the raw gaze position information gathered at step 1002 may be used to determine the position, velocity, and acceleration of the user's eyes during the pre-processing of step 1004.

Using the pre-processed data, event detection/classificaiton may also be performed at step 1004. In event detection/classification, the data may be assessed to determine if a saccade is occurring. Certain eye movements may involve eye movement that is different than a saccade (e.g., a smooth pursuit eye movement). Other events may occur that result in missing data points (e.g., a blink, partial eyelid closure, or extreme-angle viewing) but that are different from saccades. To accurately predict the point of gaze of the user as desired, it is important to identify whether a saccade or another one of the aforementioned behaviors is occurring. When a saccade is occurring, a LSTM-based prediction network may be used to identify the landing position of the saccade. However, if a saccade is not occurring, the LSTM-based prediction network may not make an accurate prediction and therefore may not be used. The LSTM-based prediction network may also optionally make predictions for relatively slower eye movements such as smooth pursuit, VOR, and/or OKN.

As shown in FIG. 10, if no saccade is detected at step 1004, the method may proceed to step 1010. At step 1010, the LSTM-based final displacement estimate circuit may bypass the additional processing of steps 1006 and 1008 and simply output the current point of gaze to foveation unit 102. Because a saccade or a fast eye movement is not occurring, the current point of gaze position may be the default estimate for the point of gaze for the foveation unit.

If a saccade is identified at step 1004, additional features may be determined using the pre-processed data from step 1004. Each feature may be an independently measurable property or characteristic that may later be used by the machine learning prediction network. In general, any desired number of features may be determined in step 1006. The features may be based on temporal relations, content variation within the display, saccade dynamics, and/or spatial location of the point of gaze.

Using the features determined in step 1006, an LSTM-based prediction network may estimate the final displacement of the saccade and an associated uncertainty at step 1008. This information may then be provided to foveation unit 102 at step 1012. The uncertainty and final displacement determined at step 1012 may be used by foveation unit 102 to render image data for the display.

Figure 11:
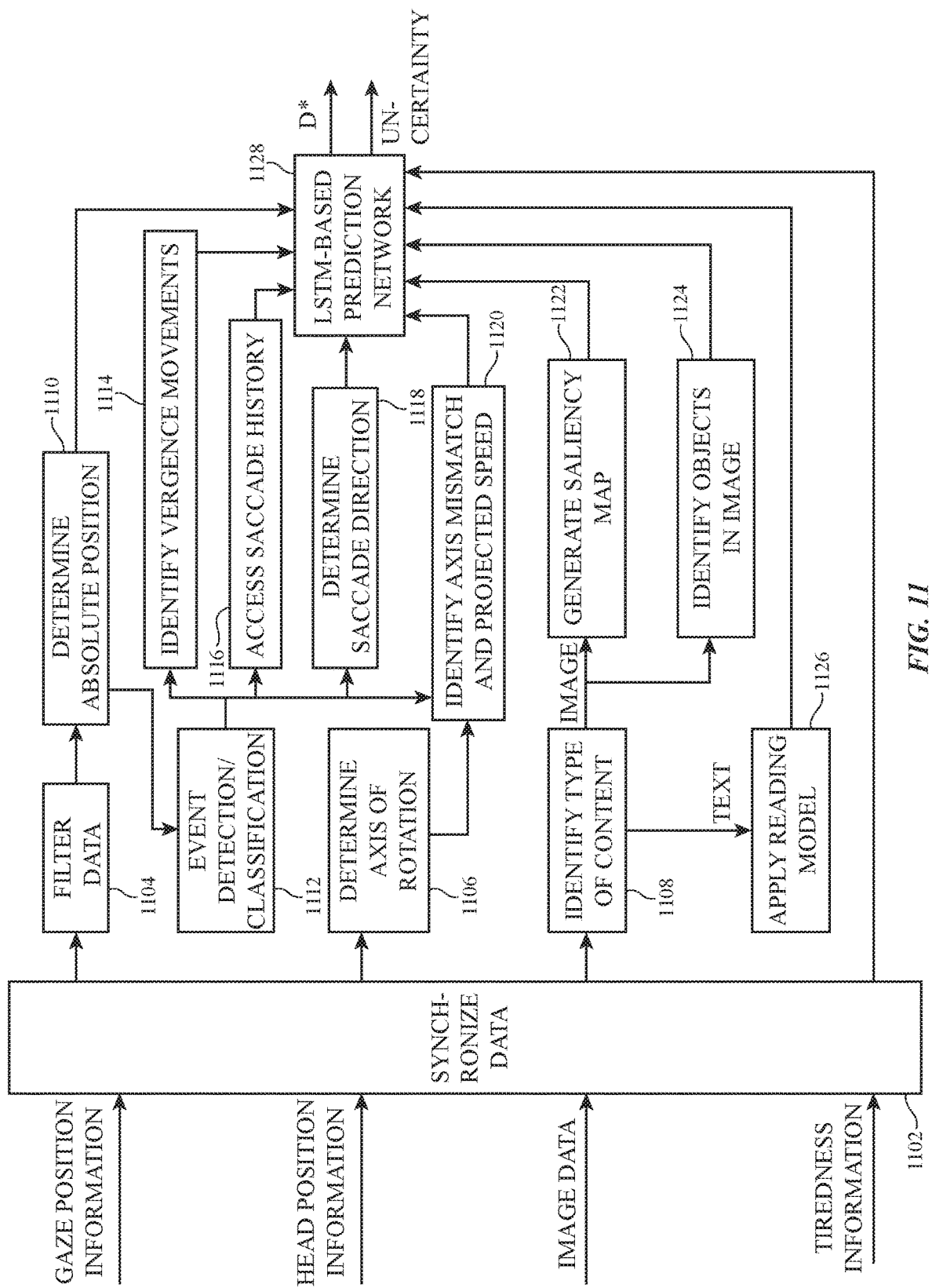
FIG. 11 is a diagram of illustrative steps used to determine features and produce a final displacement estimation using a LSTM-based prediction network in accordance with an embodiment.

FIG. 11 is a diagram showing the detailed steps used to determine features for a LSTM-based prediction network in a LSTM-based final displacement estimate circuit of the type shown in FIG. 10. As shown at step 1102, the received gaze position information, head position information, image data, and tiredness information may first be synchronized. Synchronizing the data may involve the use of one or more buffers. Once the data has been synchronized, additional pre-processing steps may be performed.

Steps 1104, 1106, 1108, 1110, and 1112 in FIG. 11 may all be considered pre-processing steps (e.g., step 1004 in FIG. 10). At step 1104, the received data may be filtered. A smoothing filter such as a Savitzky-Golay filter, median filter, exponential moving average, bilateral filter, wavelet signal denoising filter, or any other desired type of filter may first be applied to the received data (e.g., the received gaze position information). The head position information may also be filtered if desired.

At step 1106, the head position information may be used to determine the axis of rotation of the user's head. The received head position information may include three rotating parameters and three translation parameters. To reduce the number of dimensions of the received head position information, the axis on which the user's head moves is determined in step 1106.

At step 1108, the image data may be analyzed to identify the type of content presented using the image data. For example, the image data may identify that the type of content being presented is text-based or image-based. The saccade dynamics associated with viewing text-based content may be different than the saccade dynamics associated with viewing image-content, so analyzing the content on the display may help improve the final displacement estimation. Any desired image processing techniques may be used to analyze the image data in step 1108.

At step 1110, the gaze position information (e.g., the raw gaze position data gathered during step 1002 of FIG. 10) may be used to determine the absolute position of the user's point of gaze relative to the display. The velocity and acceleration of the user's eyes may also be determined using the raw gaze position data at step 1110. The absolute position of the user's point of gaze relative to the display may influence the type of saccades that are likely to occur. For example, if the point of gaze is located at the center of the display, saccade tendencies may be different than if the point of gaze is located at the edge of the display.

At step 1112, an event detection/classification probability analysis may be performed. The event detection/classification probability analysis may determine the probability that a saccade is occurring. There may be a given threshold that needs to be exceeded to identify a saccade as taking place. The threshold may be 90%, 95%, 80%, 75%, between 70 and 98%, greater than 99%, greater than 95%, greater than 90%, greater than 80%, greater than 70%, greater than 60%, greater than 50%, between 50% and 95%, less than 99%, etc. As mentioned in connection with step 1004 of FIG. 10, if no saccade is detected (e.g., if the determined saccade probability is lower than the threshold) then the current gaze position information may be provided to foveation unit 102 for further processing. If, however, the determined probability exceeds the threshold then a saccade is identified as occurring. If no saccade is detected but smooth-pursuit, VOR, or OKN is detected, this event label along with other features may be passed to the LSTM prediction network to make a prediction.

If a saccade is identified as occurring, additional features may be determined for the LSTM-based prediction network 1128. The absolute position of the user's point of gaze determined in step 1110 may be a feature that is used by LSTM-based prediction network 1128. Additional features may be determined in steps 1114, 1116, 1118, 1120, 1122, 1124, and 1126.

As shown in FIG. 11, at step 1114, vergence movements may be identified using the available information (e.g., eye-in-head direction and position information, head-in-world direction and position information, etc.). A vergence is the simultaneous movement of both eyes in opposite directions. Information on whether a vergence is occurring may be used by the LSTM-based prediction network to make a final displacement estimate.

At step 1116, saccade history may be obtained. The saccade history may include information on the last N saccades performed by the user. The saccade history may include any desired number N of previous saccades (e.g., more than one, more than ten, more than one hundred, more than one thousand, more than ten thousand, less than ten thousand, etc.). Each historical saccade data point may include information on the displacement distance, displacement direction, and displacement time of the saccade, as well as the time elapsed since the saccade occurred. If desired, more weight may be lent to saccades that have occurred recently. In addition to saccade history, history of other types of eye/head movements may also be stored and used to inform the prediction network.

At step 1118, the saccade direction may be determined. The saccade direction may be determined by comparing the current point of gaze to previous points of gaze (e.g., the point of gaze within the previous 30 milliseconds). The direction of the saccade may be determined by estimating the direction between the point of the gaze at the start of the saccade and the current point of gaze. The saccade may be assumed to take place in a straight line. Alternatively, the saccade curvature over time may also be used as a feature in the LSTM prediction network to improve prediction accuracy.

The head position information and axis of rotation of the user's head may be used to identify axis mismatch and projected head speed at step 1120. The axis mismatch may refer to a mismatch between the axis of rotation associated with the user's head and the axis of rotation associated with the user's eye.

Steps 1122 and 1124 may be performed if image-based content is identified in the image data (as opposed to text-based content). At step 1122, a saliency map may be generated using the received image data. The saliency map may be used to identify items of visual interest within the displayed content. The saliency map may identify items such as selectable buttons, text, and other items of visual interest. The saliency map may be a probability density map in which features of visual interest are highlighted.

At step 1124, objects within the displayed image data may be identified. For example, image segmentation may be performed to identify objects of interest in the displayed content. Identifying objects in the image data may be useful in predicting a user's saccadic landing position. If a saccade occurs in the direction of an object of interest, it may be likely that the final landing position of the saccade will be at the position of the object of interest.

If the image data shows that primarily text-based content is being presented using the display, steps 1122 and 1124 may be omitted. Instead, a reading model may be applied at step 1126. Eye movement behavior (including saccades) when reading text may follow known patterns. For example, the user may be likely to scan the text on a row-by-row basis with a saccade between the end of a given row and the beginning of the subsequent row. Therefore, the fact that the user is likely reading text on the display (as well as the location of the text) may be an additional feature that is provided to LSTM-based prediction network 1128.

Additionally, the tiredness information may be provided to the LSTM-based prediction network. As previously mentioned, the tiredness information may include the length of time elapsed since the user started using the electronic device (e.g., the amount of time the electronic device has been used in the current use session). Additional information correlated with tiredness (e.g., the total length of time across multiple sessions the user has used the electronic device within a set period of time, information regarding the user's sleep patterns, etc.) may be provided to the LSTM-based prediction network. Blink rate (e.g., how many times the user blinks per minute) may also be used as a proxy to tiredness. The blink rate may also be provided to the LSTM-based prediction network.

The examples of features provided to LSTM-based prediction network 1128 in FIG. 11 are merely illustrative. In general, any desired number of features may be used by the LSTM-based prediction network to produce a final displacement estimate output with corresponding uncertainty. The features may relate to temporal relations, content variation, saccade dynamics, or spatial location, as a few examples. Temporal relations may account for the short and long term dependencies of all of the features. Any desired number of past saccades may be considered to derive information about saccade tendencies. Content variation may refer to analysis of the image data to determine which portions of the display the user is likely to view. Saccade dynamics includes analyzing the velocity-curve of a saccadic eye movement, identifying vergence eye movements, and obtaining other information regarding the movement of the eye during the saccade. Spatial location includes the absolute position of the point of gaze of the user, which is used to accurately predict a landing position of the saccade.

LSTM-based prediction network 1128 may receive various features and may generate a final displacement estimate (D*) and a corresponding uncertainty based on the received features. LSTM-based prediction network 1128 is a machine-learning-based prediction. The LSTM-based prediction network may be trained using a large offline dataset. For example, the offline dataset may include raw data (e.g., gaze position information, head position information, image data, event label, and tiredness information) corresponding to eye movements that are known to be saccades. The data set may include the known landing position of each saccade, which is used as the ground truth for the prediction network. The LSTM-based prediction network may include numerous parameters that are refined during training to have the prediction network predict a final displacement estimate D* that matches the ground truth final displacement. The LSTM-based prediction network (sometimes referred to as a gaze prediction model) may also be trained during operation of the electronic device using past gaze data from the user. For example, once a saccade is complete, the final landing position (and final displacement) of the saccade is known. This final landing position and the raw data of the saccade can be used for additional refinement of the model's parameters (with the known final landing position serving as the ground truth).

Figure 12:
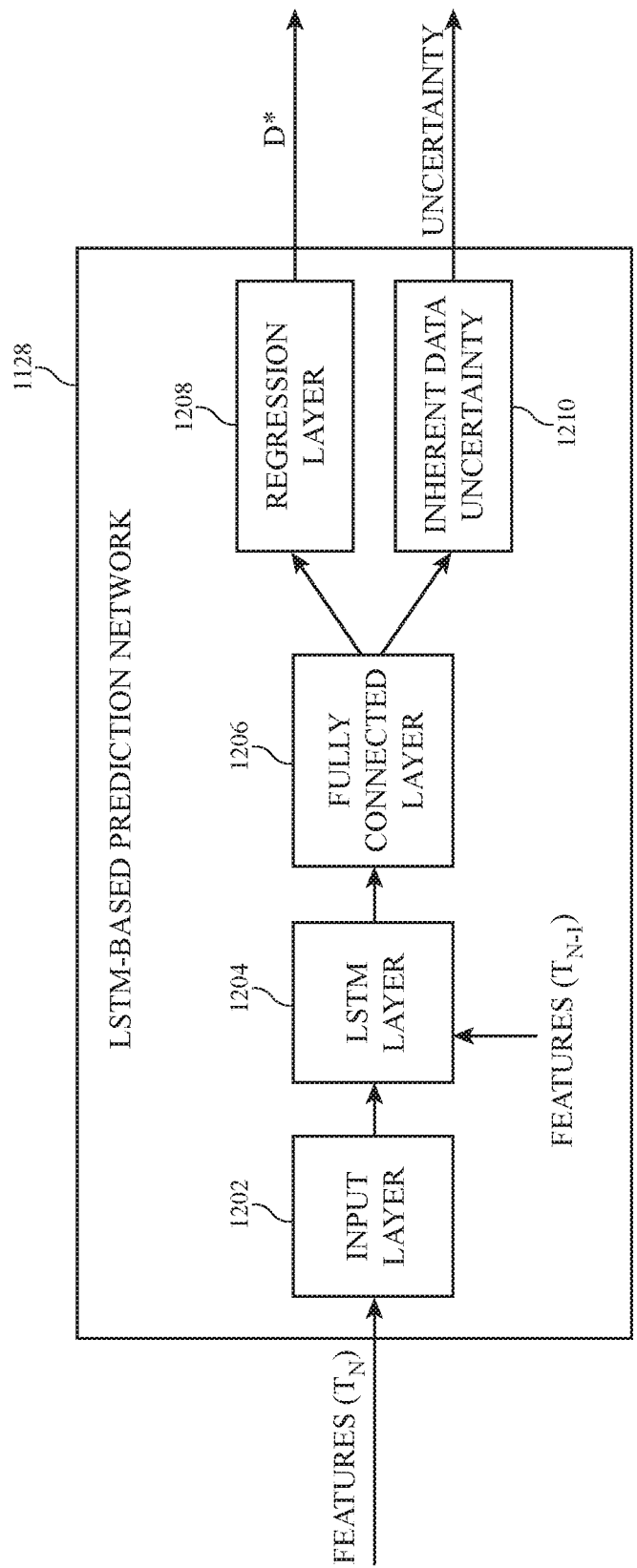
FIG. 12 is a diagram of an illustrative LSTM-based prediction network of the type shown in FIG. 11 in accordance with an embodiment.

The LSTM-based prediction network is characterized by sharing of information among different time steps. For example, the data of previous time points is used when analyzing the data of a given time point. The LSTM-based prediction network is further characterized by sharing of information between the features. As shown in FIG. 12, the LSTM-based prediction network 1128 includes an input layer 1202 that receives the features at a given time $T_N$ as input. The input layer may include 13 neurons in one example. This example is merely illustrative and the input layer may have any desired number of neurons (e.g., between 10 and 20, more than κ, more than 10, etc.).

The features may be provided form the input layer 1202 to long short term memory (LSTM) layer 1204. The LSTM layer may include 64 units and may have dropouts. This example is merely illustrative and the LSTM layer may have any desired number of units (e.g., more than 20, more than 40, more than 60, more than 80, more than 100, less than 100, between 20 and 100, etc.). Dropout refers to, based on a predetermined probability, excluding LSTM units from activation to reduce overfitting and improve model performance. Each LSTM unit may receive information from each of the features received at input layer 1202. The LSTM units may also receive information regarding features from previous time points such as the features from time $T_{N-1}$. Information from the LSTM units at time $T_N$ may be used by the LSTM units in subsequent times (e.g., at $T_{N+1}$).

The information from the LSTM layer is ultimately provided to fully connected layer 1206. Fully connected layer 1206 may have connections to all of the neurons of the previous layer. The fully connected layer may provide output to regression layer 1208 and inherent data uncertainty block 1210. Regression layer 1208 may be used to determine the final displacement estimate D*. Regression approaches that may be used by regression layer 1208 include linear regression, logistic regression, polynomial regression, stepwise regression, ridge regression, lasso regression, and other suitable techniques. Additionally, the uncertainty may be determined by inherent data uncertainty block 1210. The total uncertainty output from the LSTM-based prediction network may account for uncertainty arising from the model itself (sometimes referred to as model uncertainty) and inherent uncertainty in the data (sometimes referred to as inherent data uncertainty).

Any desired technique may be used to estimate the model uncertainty. In one example, a variational inference technique called Monte Carlo dropout may be used to estimate the uncertainty of the model. In ideal conditions, with infinite training data and training time, the model uncertainty will approach zero. However, in practice, the model uncertainty is non-negligible. The inherent data uncertainty is uncertainty associated with the data itself. A saccade may occur over a total length of time that is less than 100 milliseconds. In general, saccades do not exceed 100 milliseconds. At the beginning of a saccade, there may be more uncertainty in predicting the final saccade landing position. In other words, there is stochasticity in the data such that the same input data may result in different final results. The longer the saccade progresses, the more the inherent data uncertainty will decrease. Uncertainty estimator 1210 may output the total uncertainty associated with the final displacement estimate, accounting for both the model uncertainty and the inherent data uncertainty.

Event detection/classification (e.g., step 1112 in FIG. 11) may be performed using a machine-learning-based algorithm or may be performed without using machine learning (e.g., using a signal processing approach). In the signal processing approach, the gaze position information (e.g., the absolute position received from step 1110 in FIG. 11) may be processed to determine the probability of a saccade occurring. The signal processing may include comparing the current eye movement to known saccadic behavior. For example, saccades may occur over a certain known length of time (e.g., less than 100 milliseconds), so eye movement with a duration longer than a certain threshold in milliseconds (e.g., 100 milliseconds or some other threshold) may be determined to not be a saccade. There may be a refractory period between saccades, meaning that a saccade cannot occur within a certain length of time from the previous saccade. The acceleration, angular deviation, and position of the point of gaze of the eye may all be used to assess the probability of a saccade.

In an alternative to the signal-processing-based event detection/classification probability analysis discussed above, machine-learning-based event detection/classification probability analysis may also be used. In other words, a model trained using machine learning may be used to determine the probability of a saccade occurring. The saccade detection may be performed using an autoencoder model that is trained to encode saccades. An autoencoder is an artificial neural network that learns to encode data into a latent space by reducing the dimensions of the data then decode the data from the latent space. The autoencoder is trained to match its outputs to the inputs, and thus how to best encode the distribution of the inputs within the latent representation.

Figure 13:
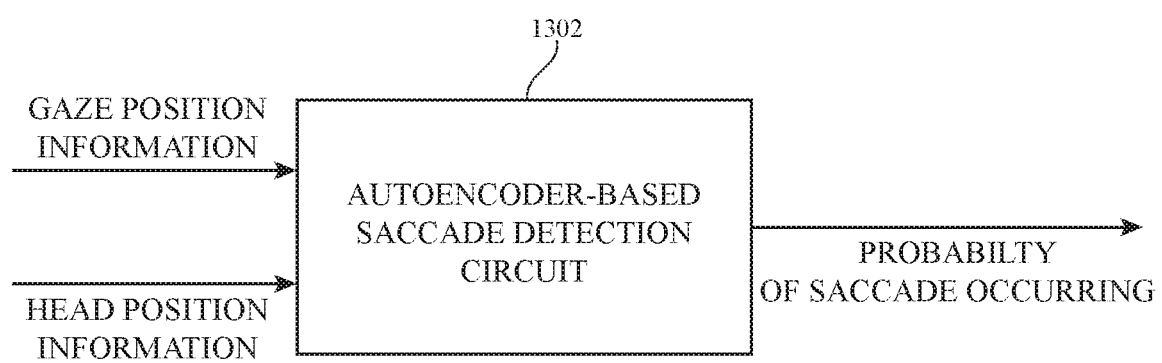
FIG. 13 is a diagram of an illustrative autoencoder-based saccade prediction circuit that may be used to determine the probability of whether a saccade is occurring in accordance with an embodiment.

FIG. 13 is a schematic diagram of an autoencoder-based based saccade detection circuit 1302. As shown, the autoencoder-based saccade detection circuit may receive information such as gaze position information and head position information. Other information such as the image data and tiredness information may also be received if desired. Based on the information, the autoencoder-based saccade detection circuit may output a probability of a saccade occurring.

The autoencoder in autoencoder-based saccade detection circuit 1302 may be trained using data from known saccades. When the autoencoder receives data of a similar distribution to the training data (e.g., when a saccade is occurring), the autoencoder may be able to encode the data well. However, if the autoencoder receives data of a different distribution from the training data (e.g., from eye movement other than a saccade), the autoencoder will not be able to encode the data well. The autoencoder's inability to effectively process data that is not from a saccade is harnessed to detect whether or not a saccade is occurring.

The autoencoder is therefore trained to encode saccadic eye movements. The autoencoder may receive data that has already been filtered to reduce signal noise or may receive unfiltered data (e.g., unfiltered gaze position information and unfiltered head position information). The autoencoder's uncertainty as to whether a new input comes from the same statistical distribution as the original training data (e.g., the new input is from a saccade) or comes from a different statistical distribution from the original training data (e.g., the new input is not from a saccade) may be characterized using a variational inference technique such as Monte Carlo dropout uncertainty estimation. The uncertainty estimation block in autoencoder-based saccade detection circuit 1302 may estimate the probability of whether or not the input is from a saccade (e.g., the probability of a saccade occurring is output).

The representation in FIG. 11 of event detection/classification occurring before the determination of features such as features 1114, 1116, etc. is merely illustrative. In general, event detection/classification may be performed at any desired point once the input data (e.g., gaze position information) is available.

In several of the previous embodiments, arrangements have been described where a saccade displacement D* is estimated. It should be understood that the ultimate saccadic landing position may easily be derived from saccade displacement D* (using the starting point of the saccade and the direction of the saccade). In general, any or all of the predicted distance remaining in the saccade, the predicted total distance of the saccade, and the predicted landing position of the saccade may be output by the gaze prediction system (e.g., from LSTM-based prediction network 1128 in FIG. 11).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
    a gaze tracking system configured to produce point of gaze information;
    a display configured to output an image with regions of different resolutions or quality based on the point of gaze information; and
    a gaze prediction system configured to analyze the point of gaze information produced by the gaze tracking system to subsequently predict a saccadic landing position, wherein the display is configured to update the image based on the predicted saccadic landing position and wherein the gaze prediction system is configured to categorize image data for the display as a selected one of image-based content and text-based content and predict the saccadic landing position based on the point of gaze information and based on the categorization of the image data as the selected one of image-based content and text-based content.

2. The electronic device of claim 1, further comprising:
    a head position tracking system configured to produce head rotation information, wherein the gaze prediction system is further configured to analyze the head rotation information from the head position tracking system to subsequently predict and refine the saccadic landing position.

3. The electronic device of claim 2, wherein the gaze prediction system is configured to detect when gaze prediction has to be performed by checking whether a set of conditions are met.

4. The electronic device of claim 3, wherein the gaze prediction system does not perform the gaze prediction when the point of gaze information is indicative of an eye blink, a smooth pursuit eye movement (SPEM), or a partial lid closure.

5. The electronic device of claim 2, further comprising:
    an initial displacement estimation circuit configured to receive the point of gaze information to produce an initial estimated gaze displacement value;
    a decision boundary determination and lookup circuit configured to receive the initial estimated gaze displacement value and an eye movement velocity from the initial displacement estimation circuit, to receive the head rotation information from the head position tracking system, to map the received initial estimated gaze displacement value, the eye movement velocity, and the head rotation information to a selected model in a plurality of models, and to output a corresponding index associated with the selected model; and
    a final displacement estimation circuit configured to receive the index from the decision boundary determination and lookup circuit and to compute a corresponding final estimated gaze displacement value that is used to predict the saccadic landing position, wherein the initial displacement estimation circuit and the final displacement estimation circuit are trained by applying a regression process to a dataset, and wherein the decision boundary determination and lookup circuit is trained by applying a clustering process to the dataset.

6. The electronic device of claim 2, wherein the gaze prediction system comprises:
a decision boundary determination circuit configured to receive the point of gaze information and the head rotation information and to map the received point of gaze information and the head rotation information to a selected model in a plurality of models.

7. The electronic device of claim 6, wherein the gaze prediction system further comprises:
an estimation circuit configured to compute an estimated gaze displacement value that is used to predict the saccadic landing position.

8. The electronic device of claim 7, wherein the decision boundary determination circuit is trained by applying an unsupervised clustering process to a dataset.

9. The electronic device of claim 7, wherein the estimation circuit is trained by applying a regression process to a dataset, wherein the decision boundary determination circuit and the estimation circuit are jointly trained.

10. The electronic device of claim 1, wherein the gaze prediction system is configured to predict the saccadic landing position based on the point of gaze information and based on head position information from a head tracking system.

11. The electronic device of claim 1, wherein the gaze prediction system comprises a long-short-term-memory-based (LSTM-based) prediction network that is configured to predict the saccadic landing position.

12. The electronic device of claim 11, wherein the LSTM-based prediction network includes an input layer, a long short term memory (LSTM) layer, a fully connected layer, a regression layer that is configured to predict the saccadic landing position, and an uncertainty estimator that is configured to output an uncertainty that is associated with the predicted saccadic landing position.

13. An electronic device, comprising:
a gaze tracking system configured to produce point of gaze information;
a display configured to output an image with regions of different resolutions or quality based on the point of gaze information; and
a gaze prediction system configured to analyze the point of gaze information produced by the gaze tracking system to subsequently predict a saccadic landing position, wherein the display is configured to update the image based on the predicted saccadic landing position, wherein the point of gaze information includes eye movement velocity, and wherein the gaze prediction system is configured to predict the saccadic landing position only when the eye movement velocity crosses a predetermined threshold level.

14. An electronic device, comprising:
a gaze tracking system configured to produce point of gaze information;
a display configured to output an image with regions of different resolutions or quality based on the point of gaze information; and
a gaze prediction system configured to analyze the point of gaze information produced by the gaze tracking system to subsequently predict a saccadic landing position, wherein the display is configured to update the image based on the predicted saccadic landing position and wherein the gaze prediction system is configured to predict the saccadic landing position based on the point of gaze information and based on a length of time that the electronic device has been in use.

15. Circuitry, comprising:
a display configured to output an image having a high resolution or quality region and one or more regions of progressively lower resolutions or quality surrounding the high resolution or quality region, wherein the high resolution or quality region overlaps with a user's point of gaze;
a gaze tracking system configured to track the user's point of gaze, wherein the user's point of gaze moves from a first point of regard at an onset of a saccade to a second point of regard at an end of the saccade;
a head tracking system configured to track the position of the user's head;
a gaze prediction system configured to predict a saccadic landing position to estimate the second point of gaze before the gaze tracking system detects the second point of gaze, wherein the gaze prediction system comprises:
a clustering-based decision boundary determination circuit configured to receive displacement and timing information from the gaze tracking system and head rotation information from the head tracking system to subsequently map the received displacement and timing information to a selected model in a plurality of models; and
a regression-based final displacement estimation circuit configured to compute a final gaze displacement estimate using parameters associated with the selected model, wherein the final gaze displacement estimate is used to predict the saccadic landing position.

* * * * *